(12) United States Patent
Brown et al.

(10) Patent No.: US 8,940,259 B2
(45) Date of Patent: Jan. 27, 2015

(54) CATALYSED SOOT FILTER

(71) Applicant: Johnson Matthey Public Limited Company, London (GB)

(72) Inventors: Gavin Michael Brown, Essex (GB); Andrew Francis Chiffey, Ware (GB); David Marvell, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/068,424

(22) Filed: Oct. 31, 2013

(65) Prior Publication Data

US 2014/0161693 A1 Jun. 12, 2014

Related U.S. Application Data

(60) Provisional application No. 61/721,713, filed on Nov. 2, 2012.

(30) Foreign Application Priority Data

Oct. 31, 2012 (GB) .................................. 1219600.2

(51) Int. Cl.
| | |
|---|---|
| B01D 35/00 | (2006.01) |
| B01D 46/00 | (2006.01) |
| B01D 53/94 | (2006.01) |
| F01N 3/021 | (2006.01) |
| F01N 3/10 | (2006.01) |
| B01J 23/40 | (2006.01) |
| B01J 23/48 | (2006.01) |
| B01J 35/04 | (2006.01) |
| F01N 3/022 | (2006.01) |
| F01N 3/035 | (2006.01) |
| F01N 3/08 | (2006.01) |
| F01N 3/20 | (2006.01) |

(52) U.S. Cl.
CPC ............. *B01D 53/9431* (2013.01); *B01J 23/40* (2013.01); *B01J 23/48* (2013.01); *B01D 53/944* (2013.01); *B01D 53/9472* (2013.01); *B01D 53/9477* (2013.01); *B01J 35/04* (2013.01); *F01N 3/0222* (2013.01); *F01N 3/035* (2013.01); *F01N 3/0814* (2013.01); *F01N 3/103* (2013.01); *F01N 3/106* (2013.01); *F01N 3/2066* (2013.01); *B01D 2255/10* (2013.01); *B01D 2255/9032* (2013.01); *B01D 2255/9155* (2013.01); *F01N 2510/06* (2013.01); *F01N 2510/0682* (2013.01); *Y02T 10/24* (2013.01); *F01N 2610/02* (2013.01); *F01N 2510/068* (2013.01); *Y10S 55/30* (2013.01)
USPC .................. 423/213.2; 423/213.5; 423/239.1; 55/525; 55/DIG. 30; 60/272; 60/274; 60/297; 60/299; 60/301; 95/285; 502/325; 502/344; 502/302

(58) Field of Classification Search
USPC ....... 55/525, DIG. 30; 60/274, 299, 301, 272, 60/297; 95/285; 502/325, 344, 302; 423/213.2, 213.5, 239.1
See application file for complete search history.

(56) References Cited

U.S. PATENT DOCUMENTS

| | | | | |
|---|---|---|---|---|
| 4,902,487 | A * | 2/1990 | Cooper et al. | 423/215.5 |
| 7,119,044 | B2 * | 10/2006 | Wei et al. | 502/300 |
| 7,498,010 | B2 * | 3/2009 | Andreasson et al. | 423/239.1 |
| 7,722,829 | B2 * | 5/2010 | Punke et al. | 422/180 |
| 7,922,987 | B2 | 4/2011 | Koegel et al. | |
| 7,964,154 | B2 * | 6/2011 | Makkee et al. | 422/171 |
| 2010/0058745 | A1 | 3/2010 | Kim | |

FOREIGN PATENT DOCUMENTS

| | | |
|---|---|---|
| EP | 1486248 A1 | 12/2004 |
| EP | 1273779 A2 | 1/2008 |
| EP | 2161420 A1 | 3/2010 |
| EP | 2505802 A2 | 10/2012 |
| GB | 2481057 A | 12/2011 |
| WO | 9947260 | 9/1999 |
| WO | 0029726 | 5/2000 |
| WO | 02/14657 A1 | 2/2002 |
| WO | 2004079167 A1 | 9/2004 |
| WO | 2006031600 A1 | 3/2006 |
| WO | 2009139107 | 11/2009 |
| WO | 2011061321 A1 | 5/2011 |
| WO | 2011080525 | 7/2011 |

OTHER PUBLICATIONS

Great Britain Search Report for corresponding Great Britain Patent Application No. GB1219600.2 dated Feb. 3, 2013.
PCT Search Report for corresponding PCT Patent Application No. PCT/GB2013/052851 dated Jan. 27, 2014.
Wei, Q. et al., "Single-Stage Dilution Tunnel Performance," SAE 2001 World Congress, Detroit, Michigan, Mar. 5-8, 2001; SAE Technical Paper 2001-01-0201.
Abdul-Khalek, I.S. et al., "Diesel Exhaust Particle Size: Measurement Issues and Trends," International Congress and Exposition, Detroit, Michigan, Feb. 23-26, 1998; SAE Technical Paper 980525.

* cited by examiner

*Primary Examiner* — Timothy Vanoy
(74) *Attorney, Agent, or Firm* — Kevin M. Carroll

(57) ABSTRACT

A catalyzed soot filter for a diesel engine comprises a wall flow substrate having a substrate axial length, wherein surfaces of both the internal walls of a plurality of inlet and a plurality of outlet channels comprise a catalytic washcoat of at least one on-wall coating composition for oxidizing NO in exhaust gas to $NO_2$, wherein the washcoat on the inlet channels extends for an axial inlet coating length from an open inlet end to a downstream inlet coating end, the washcoat on the outlet channels extends for an axial outlet coating length from an upstream outlet end to an open outlet end, the axial inlet coating length and the axial outlet coating length are both less than the substrate axial length and the outlet coating length is greater than the inlet coating length.

20 Claims, 3 Drawing Sheets

CATALYSED SOOT FILTER

CROSS REFERENCE TO RELATED APPLICATIONS

This application claims priority benefit to Great Britain Patent Application No. 1219600.2 filed Oct. 31, 2012 and U.S. Provisional Patent Application No. 61/721,713 filed Nov. 2, 2012, both of which are incorporated herein by reference.

FIELD OF THE INVENTION

The present invention relates to a catalysed soot filter for treatment of diesel engine exhaust emissions which removes particulate matter (PM), hydrocarbons (HC) and carbon monoxide (CO) from the exhaust emissions and simultaneously enriches nitrogen dioxide ($NO_2$) concentration in the oxides of nitrogen ($NO_x$) emitted from diesel engines to enable more efficient treatment of such nitrogen oxides. The present invention also relates to an emission treatment system for a diesel engine comprising the catalysed soot filter and a selective catalytic reduction (SCR) catalyst downstream of the catalysed soot filter. The invention further relates to an emission treatment system for a diesel engine comprising a diesel oxidation catalyst, downstream of which is the catalysed soot filter and SCR catalyst.

BACKGROUND TO THE INVENTION

Vehicular emissions which are the principle pollutants that have negative effects on public health and the natural environment are generally recognised to be carbon monoxide, hydrocarbons, nitrogen oxides ($NO_x$) and particulate matter.

Diesel engines run at a high air to fuel ratio under very fuel lean conditions. Because of this they have low levels of emissions of gas phase hydrocarbons and carbon monoxide and are instead characterised by relatively high levels of emissions of $NO_x$ and particulate matter, relative to the current and agreed future emission regulations set by intergovernmental organisations. The control of particulate matter emissions and of NOx represent significant challenges to the diesel engine manufacturer because they are coupled inversely. Modern passenger vehicles include exhaust gas recirculation. When the engine operates cooler it produces less $NO_x$ but more particulate matter and conversely at higher temperatures combustion is more complete generating less particulate matter but more $NO_x$. Therefore changes in engine design need to be combined with effective trapping and treatment processes to limit the emissions of these harmful pollutants to the atmosphere.

Emission legislation in Europe from 1st September 2014 (Euro 6) maintains the allowable limit set in Euro 5 (which came into force in September 2009 for the approval of vehicles and applied from January 2011 for registration and sales of new types of cars) for the mass of particulate matter emitted from diesel passenger cars of 4.5 mg/km as measured by the particulate measurement programme procedure.

However, for Euro 6, all vehicles equipped with a diesel engine will be required substantially to reduce their emissions of nitrogen oxides as soon as Euro 6 enters into force. For example emissions from passenger cars will be capped at 80 mg/km which is a reduction of more than 50% as compared to the Euro 5 standards. Furthermore combined emissions of hydrocarbons and nitrogen oxides from diesel vehicles will also be reduced. For example, these will be capped at 170 mg/km for passenger cars.

Therefore, the new Euro 6 emission standard presents a number of challenging design problems for meeting diesel emission standards. In particular, how to design a filter, or an exhaust system including a filter, to reduce the $NO_x$ and combined NO and hydrocarbon emissions, yet at the same time meeting the emission standards for PM pollutants and CO all at an acceptable back pressure, e.g. as measured by maximum on-cycle backpressure on the EU drive cycle.

Ambient particulate matter is typically divided into the following categories based on their aerodynamic diameter (the aerodynamic diameter is defined as the diameter of a 1 $g/cm^3$ density sphere of the same settling velocity in air as the measured particle):

(i) Particles of an aerodynamic diameter of less than 10 μm (PM-10);
(ii) Fine particles of diameter below 2.5 μm (PM-2.5);
(iii) Ultrafine particles of diameter below 100 nm; and
(iv) Nanoparticles of diameter below 50 nm.

Since the mid-1990s, particle size distributions of particulates exhausted from internal combustion engines have received increasing attention due to possible adverse health effects of fine and ultrafine particles. Concentrations of PM-10 particulates in ambient air are regulated by law in the USA. A new, additional ambient air quality standard for PM-2.5 was introduced in the USA in 1997 as a result of health studies that indicated a strong correlation between human mortality and the concentration of fine particles below 2.5 μm.

Interest has now moved to consider ultrafine and nanoparticles generated by diesel and gasoline engines because they are understood to penetrate more deeply into human lungs than particulates of greater size and consequently they are believed to be more harmful than larger particles. This belief is extrapolated from the findings of studies into particulates in the 2.5-10.0 μm range.

Size distributions of diesel particulates have a well-established bimodal character that correspond to the particle nucleation and agglomeration mechanisms, with the corresponding particle types referred to as the nuclei mode and the accumulation mode respectively.

In the nuclei mode, diesel particulate is composed of numerous small particles holding very little mass. Nearly all nuclei mode diesel particulates have sizes of significantly less than 1 μm, i.e. they comprise a mixture of fine, ultrafine and nanoparticles. Nuclei mode particles are believed to be composed mostly of volatile condensates (hydrocarbons, sulphuric acid, nitric acid etc.) and contain little solid material, such as ash and carbon.

Accumulation mode particles are understood to comprise solids (carbon, metallic ash etc.) intermixed with condensates and adsorbed material (heavy hydrocarbons, sulfur species, nitrogen oxide derivatives etc.) Coarse mode particles are not believed to be generated in the diesel combustion process and may be formed through mechanisms such as deposition and subsequent re-entrainment of particulate material from the walls of an engine cylinder, exhaust system, or the particulate sampling system.

The composition of nucleating particles may change with engine operating conditions, environmental condition (particularly temperature and humidity), dilution and sampling system conditions. Laboratory work and theory have shown that most of the nuclei mode formation and growth occur in the low dilution ratio range. In this range, gas to particle conversion of volatile particle precursors, like heavy hydrocarbons and sulphuric acid, leads to simultaneous nucleation and growth of the nuclei mode and adsorption onto existing particles in the accumulation mode. Laboratory tests (see e.g.

SAE 980525 and SAE 2001-01-0201) have shown that nuclei mode formation increases strongly with decreasing air dilution temperature but there is conflicting evidence on whether humidity has an influence.

Generally, low temperature, low dilution ratios, high humidity and long residence times favour nanoparticles formation and growth. Studies have shown that nanoparticles consist mainly of volatile material like heavy hydrocarbons and sulphuric acid with evidence of solid fraction only at very high loads.

Particulate collection of diesel particulates in a diesel particulate filter is based on the principle of separating gas-borne particulates from the gas phase using a porous barrier. Diesel particulate filters can be defined as deep-bed filters and/or surface-type filters. In deep-bed filters, the mean pore size of filter media is bigger than the mean diameter of collected particles. The particles are deposited on the media through a combination of depth filtration mechanisms, including diffusional deposition (Brownian motion), inertial deposition (impaction) and flow-line interception (Brownian motion or inertia).

In surface-type filters, the pore diameter of the filter media is less than the diameter of the particulate matter, so particulate matter is separated by sieving. Separation is done by a build-up of collected diesel particulate matter itself, which build-up is commonly referred to as "filtration cake" and the process as "cake filtration".

It is understood that diesel particulate filters, such as ceramic wallflow monoliths, may work through a combination of depth and surface filtration: a filtration cake develops at higher soot loads when the depth filtration capacity is saturated and a particulate layer starts covering the filtration surface. Depth filtration is characterized by somewhat lower filtration efficiency and lower pressure drop than the cake filtration.

Diesel particulate filters have been shown to be extremely effective at removal of particulate matter over the entire particle size range. However these filters have limited capacity for trapping particulate matter before the pressure-drop becomes excessive therefore it is necessary periodically to regenerate the diesel particulate filter. Passive regeneration does not readily take place as combustion of the retained particulate matter in the presence of oxygen requires higher temperatures than those typically provided by diesel engine exhaust. One effective method to lower the combustion temperature of the trapped particulate matter on the diesel particulate filter is addition of a catalysed washcoat to the filter wall. Compositions of catalysed washcoats used are similar to those used in diesel oxidation catalysts and typically comprise at least one platinum group metal. The reactions on the catalysed diesel particulate filter include oxidation of CO and HC and oxidation of NO to $NO_2$ which enables combustion of the particulate matter at a much lower temperature than in the presence of oxygen.

U.S. Pat. No. 7,722,829 discloses a catalysed soot filter which simultaneously treats the CO and HC gaseous components and the particulate matter in diesel exhaust gas. The diesel particulate filter is a wall flow substrate which is coated in a washcoat comprising a platinum group metal. The washcoat is coated on to part of the internal walls of both the inlet and outlet passages of the substrate such that more than 50% of the platinum group metal components are present on the walls of the inlet passages. US '829 discloses that the positioning of the majority of the platinum group metal components upstream was found to improve the efficiency of the platinum group usage and allow the substrate to maintain its catalytic function even after multiple regeneration cycles.

Furthermore it discloses that this positioning was also found to favour the combustion of soot and regeneration of the filter with the following reasoning. The high concentrations of platinum group metals in the upstream zone of the substrate generated increased concentrations of $NO_2$ in the upstream zone (by oxidation of NO present in the diesel engine emissions) which could flow towards the outlet passages to combust soot deposited in the downstream zone where most of the soot was collected. US '829 discloses that the coatings may be disposed as a thin coating on the surface of the internal walls of the wall flow substrate and/or may permeate the porous walls to some extent.

A variety of technologies have been explored to reduce $NO_x$ emitted from diesel exhaust systems to environmentally acceptable nitrogen for release to the atmosphere. Selective $NO_x$ reduction (lean $NO_x$ catalyst) using the on-board diesel fuel or a derivative to selectively catalyse the oxidation of HC and $NO_x$ to $CO_2$, $H_2O$ and $N_2$ was extensively investigated and two main candidate materials identified as selective catalysts. However it has been reported in the literature that it is thought that this system will not be sufficient to meet the stringent requirements of Euro 6.

Lean $NO_x$ traps ($NO_x$ adsorber catalyst) use a basic metal oxide to adsorb $NO_x$ during the lean mode of operation. Exhaust gas rich in NO is converted to $NO_2$ over a platinum group metal-containing catalyst and the $NO_2$ is trapped and stored on e.g. an alkaline metal oxide which is incorporated within the platinum group metal-containing catalyst. The $NO_2$ is then desorbed under rich conditions and reduced using rhodium which is also incorporated on the catalyst.

SCR involves use of ammonia in the presence of a suitable catalyst, which ammonia acts as a selective reductant for $NO_x$. Typically urea is the source of the ammonia, which hydrolyses in the exhaust system at about 200° C. Suitable catalysts include metal exchanged zeolites and mixed catalysts of vanadium and titanium dioxides. The technology is potentially capable of $NO_x$ reduction of greater than 90% so it is seen as a good candidate for meeting the new stringent NOx requirements for diesel engines. However the SCR is prone to contamination from HC, CO and particulates which reduces its effectiveness. Furthermore, for many diesel engines, a majority of $NO_x$ emitted from the exhaust system is in the form of NO, whereas a faster SCR reaction proceeds from a mixture of NO and $NO_2$. $NO_2$ is a more reactive compound than NO and the faster SCR reaction can extend the operating temperature of the SCR process to lower temperatures.

WO 02/14657 discloses an aftertreatment system for lean burn diesel applications configured with a catalysed soot filter upstream of a zeolite SCR to produce substantially better $NO_x$ conversion performance than the SCR catalyst alone. The catalysed soot filter is coated on the internal walls of the filter substrate with the catalyst being applied by solution impregnation. This application technique suggests that the catalyst is substantially present within the pores of the internal walls of the substrate to minimise increase in exhaust gas back pressure caused by the catalyst as far as possible. The catalyst is coated along the full length of both the inlet channel internal walls and the outlet channel internal walls of the filter substrate. It is mentioned at page 31, lines 28-29 that it may be possible selectively to coat portions of the channels but no further exemplification is provided.

We have now designed a new catalysed soot filter for treatment of diesel engine exhaust emissions which removes PM, HC and CO from the exhaust emissions and simultaneously enriches $NO_2$ concentration in $NO_x$ emitted from a diesel engine to enable more efficient treatment of $NO_x$, for example using a SCR catalyst. The catalysed soot filter is designed such that the catalyst is substantially coated on, not in, the internal walls of the filter substrate, with different axial coating lengths on the inlet channels and outlet channels, which arrangement has been found to maintain an acceptable exhaust gas back pressure with respect to coating loading and soot trapping and regeneration and has also been found to provide enhanced $NO_2$ enrichment as compared to filters with coatings substantially or partially "in-wall".

SUMMARY OF THE INVENTION

The invention is a catalysed soot filter for a diesel engine. The filter comprises a wall flow substrate comprising an inlet end, an outlet end, a substrate axial length extending between the inlet end and the outlet end, and a plurality of channels defined by internal walls of the wall flow substrate. The plurality of channels comprise a plurality of inlet channels having an open inlet end and a closed outlet end and a plurality of outlet channels having a closed inlet end and an open outlet end. External surfaces of the internal walls of the plurality of inlet channels comprise a washcoat of at least one on-wall inlet coating composition that extends for an axial inlet coating length from the open inlet end to a downstream inlet coating end. The axial inlet coating length is less than the substrate axial length. External surfaces of the internal walls of the plurality of outlet channels comprise a washcoat of at least one on-wall outlet coating composition that extends for an axial outlet coating length from an upstream outlet end to the open outlet end. The axial outlet coating length is less than the substrate axial length. The outlet coating length is greater than the inlet coating length. Both the inlet and outlet coating compositions comprise at least one catalytically active metal as catalyst for increasing the percentage of $NO_2$ of total $NO_x$ in exhaust gas exiting the catalysed soot filter as compared to $NO_x$ gases entering the catalysed soot filter.

The invention also includes an exhaust system for a diesel engine comprising the catalysed soot filter and a selective catalytic reduction catalyst or a $NO_x$ absorber catalyst disposed downstream of the catalysed soot filter. The invention also includes a method of increasing $NO_2/NO_x$ ratio in a diesel exhaust gas comprising $NO_x$ for a downstream process. The method comprises contacting the exhaust gas with the catalysed soot filter or the exhaust system. The downstream process comprises the selective catalytic reduction of oxides of nitrogen using a SCR catalyst and a nitrogenous reductant.

DETAILED DESCRIPTION OF THE INVENTION

Figure 1:
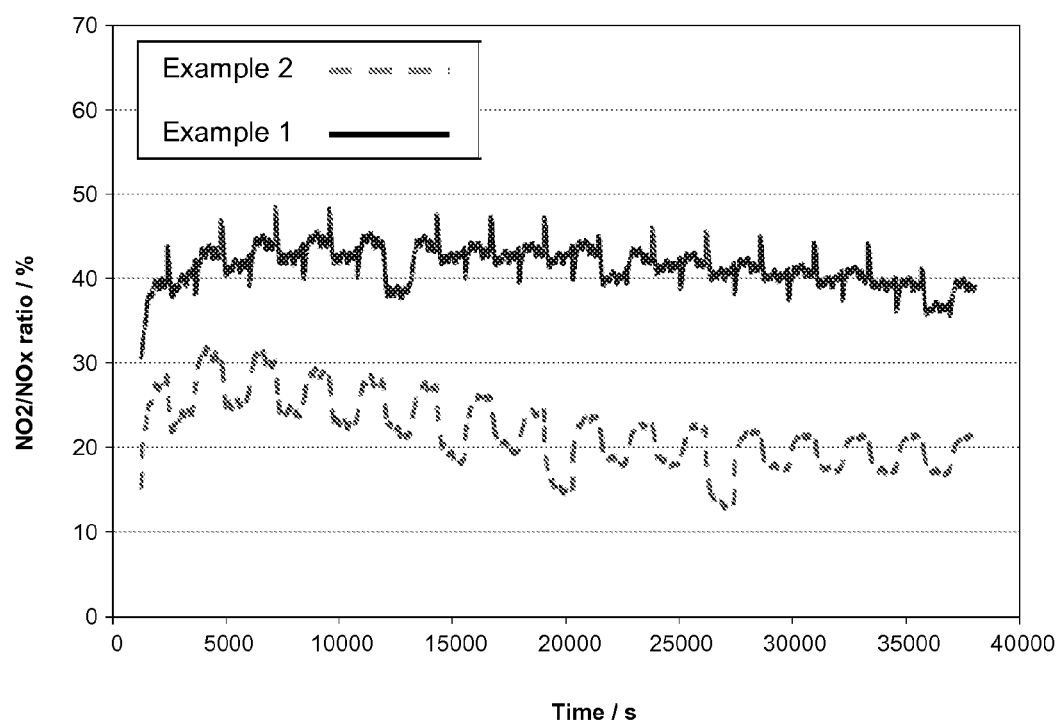
FIG. 1 is a graph showing the percentage of $NO_2$ in $NO_x$ emitted from a catalytic soot filter of the invention and for a comparative catalytic soot filter over time as the soot loading on the catalytic soot filter is increased.

According to a first aspect the invention provides a catalysed soot filter for a diesel engine, which filter comprising a wall flow substrate comprising an inlet end, an outlet end, a substrate axial length extending between the inlet end and the outlet end, and a plurality of channels defined by internal walls of the wall flow substrate, wherein the plurality of channels comprise a plurality of inlet channels having an open inlet end and a closed outlet end and a plurality of outlet channels having a closed inlet end and an open outlet end, wherein surfaces of the internal walls of the plurality of inlet channels comprise a washcoat of at least one on-wall inlet coating composition that extends for an axial inlet coating length from the open inlet end to a downstream inlet coating end, wherein the axial inlet coating length is less than the substrate axial length, wherein external surfaces of the internal walls of the plurality of outlet channels comprise a washcoat of at least one on-wall outlet coating composition that extends for an axial outlet coating length from an upstream outlet end to the open outlet end, wherein the axial outlet coating length is less than the substrate axial length, wherein the outlet coating length is greater than the inlet coating length and wherein both the inlet and outlet coating compositions comprise at least one catalytically active metal as catalyst for increasing the percentage of $NO_2$ of total $NO_x$ in exhaust gas exiting the catalysed soot filter as compared to $NO_x$ gases entering the catalysed soot filter.

Wall flow substrates for use in the present invention are preferably composed of ceramic or ceramic like materials or of refractory metals. Examples of ceramic or ceramic like materials include corderite, α-alumina, silicon carbide, silicon nitride, zirconia, mullite, spodumene, alumina-silica-magnesia or zirconium silicate. Examples of refractory metals include stainless steel. Most preferably the wall flow substrate is composed of ceramic or ceramic like materials especially cordierite and silicon carbide.

The wall flow substrate is a porous substrate which has surface pores of a mean pore size. Mean pore size can be determined by mercury porosimetry. The mean pore size is from 4 to 40 μm, for example 6 to 35 μm, 7 to 30 μm or 9 to 25 μm. Porosity is a measure of the percentage of void space in a porous substrate and is related to backpressure in an exhaust system: generally, the lower the porosity, the higher the backpressure. The ceramic or ceramic like materials of the invention have a porosity of from 35 to 75%, preferably from 38 to 70%, especially 40 to 65%.

The wall flow substrate has a plurality of fine, substantially parallel gas flow channels extending along the longitudinal axis of the substrate. Each channel is blocked at one end of the substrate with alternate channels blocked at opposite ends of the substrate. The wall flow substrate may contain up to 500 channels (cells) per square inch (cpsi) of cross section. Preferably the substrate has from 150 to 400 cpsi of cross section that can be rectangular, square, circular, oval, triangular or hexagonal. Preferably the cross section is square. The substrate has a wall thickness of from 6 to 22 mil, preferably 8 to 18 mil (thousandths of an inch).

The internal walls of the inlet channel comprise at least one on-wall inlet coating composition that extends from the inlet end to an inlet coating end wherein the inlet coating length is less than the substrate axial length. By "on-wall" it is meant that the coating composition substantially coats the surface of the internal wall and does not penetrate the pores of the internal wall. Methods of making on-wall coated porous filter substrates include introducing a polymer into the porous structure, applying a washcoat to the substrate and polymer followed by drying and calcining the coated substrate to burn the polymer out. Also methods include controlling the particle size of the washcoat particles such that they are close to or larger than the pore size of the substrate. Such methods include milling and particle size agglomeration through addition of chemical additives.

The axial inlet coating length is less than the substrate axial length. Preferably the axial inlet coating length is from 10 to 45% of the substrate axial length, more preferably from 15 to 40% of the substrate axial length.

The at least one on-wall inlet coating composition comprises at least one catalytically active metal. The at least one catalytically active metal is preferably selected from the group consisting of platinum, palladium, iridium, rhodium, gold, silver and mixtures of any two or more thereof and is more preferably platinum, palladium or a mixture of both platinum and palladium. Especially preferred are mixtures of platinum and palladium in weight ratios of from 1:0.1 to 1:2. The at least one catalytically active metal can be present on the inlet wall at a concentration of from 1 to 150 g/ft$^3$, more preferably from 5 to 100 g/ft$^3$. The at least one inlet coating composition may comprise a refractory metal oxide selected from the group consisting of alumina, silica, silica-alumina, alumina-silicates, alumina-zirconia, alumina-chromia, titania, titania-silica, titania-zirconia and titania-alumina. Concentrations of such refractory metal oxides, if present, range from 0.05 to 1.0 g/in$^3$, more preferably from 0.1 to 0.8 g/in$^3$. If present such refractory metal oxides have BET surface areas of at least 20 m$^2$/g, for example at least 50 m$^2$/g.

In an alternative embodiment the at least one inlet coating composition may comprise a rare earth metal oxide selected from an oxide of cerium, praseodymium, lanthanum, neodymium and samarium. Concentrations of such rare earth metal oxides, if present, range from 50 to 1000 g/ft$^3$, more preferably from 100 to 600 g/ft$^3$ and they have BET surface areas of at least 20 m$^2$/g, for example at least 50 m$^2$/g. Oxides of cerium are especially preferred.

In a separate embodiment the at least one inlet coating composition may comprise a combination of refractory metal oxide and rare earth metal oxide.

The at least one on-wall inlet coating composition is preferably present at a washcoat loading of 0.1 to 2.0 g/in$^3$, more preferably 0.2 to 1.0 g/in$^3$. The D50 of the washcoat loading of the at least one inlet coating composition is preferably between 4 and 15 μm.

The internal walls of the outlet channel comprise at least one on-wall outlet coating composition that extends from the outlet end to an outlet coating end wherein the axial outlet coating length is less than the substrate axial length.

The axial outlet coating length is less than the substrate axial length. Preferably the axial outlet coating length is from 55 to 90% of the substrate axial length, more preferably from 60 to 85% of the substrate axial length. The axial outlet coating length can be greater than the inlet coating length. For example the axial outlet coating length can be at least 10% longer than the axial inlet coating length when expressed as a percentage of the total substrate axial length. Alternatively, the axial inlet coating length and the axial outlet coating length together are equal to the axial substrate length.

The at least one on-wall outlet coating composition comprises at least one catalytically active metal as catalyst. The at least one catalytically active metal is preferably selected from the group consisting of platinum, palladium, iridium, rhodium, silver, gold and mixtures of any two or more thereof and is more preferably platinum, palladium or a mixture of any two or more thereof. Especially preferred are mixtures of platinum and palladium in ratios of 1:0.1 to 1:2. The at least one catalytically active metal is present on the outlet wall at a concentration from 1 to 150 g/ft$^3$, more preferably from 5 to 100 g/ft$^3$. The at least one outlet coating composition may further comprise a refractory metal oxide selected from the group consisting of alumina, silica, silica-alumina, alumina-silicates, alumina-zirconia, alumina-chromia, titania, titania-silica, titania-zirconia and titania-alumina. Concentrations of such refractory metal oxides, if present, range from 0.05 to 1.0 g/in$^3$, more preferably from 0.1 to 0.8 g/in$^3$. If present such refractory metal oxides have BET surface areas of at least 20, for example at least 50 m$^2$/g.

In an alternative embodiment the at least one outlet coating composition may comprise a rare earth metal oxide selected from an oxide of cerium, praseodymium, lanthanum, neodymium and samarium. Oxides of cerium are especially preferred. Concentrations of such rare earth metal oxides, if present, range from 50 to 1000 g/ft$^3$, more preferably from 100 to 600 g/ft$^3$ and they have BET surface areas of at least 20, for example at least 50 m$^2$/g.

In a separate embodiment the at least one outlet coating composition may comprise a combination of refractory metal oxide and rare earth metal oxide.

The at least one on-wall outlet coating composition is preferably present at a washcoat loading of 0.1 to 2.0 g/in$^3$, more preferably 0.2 to 1.0 g/in$^3$. The D50 of the washcoat loading of the at least one outlet coating composition is between 4 and 15 μm.

In one embodiment the coating composition on the inlet wall comprises the same ingredients as the coating composition on the outlet wall. In one scenario these same ingredients are present at the same concentration in each coating composition.

In all embodiments the surface porosity of the washcoat can be increased by including voids therein. By "void" herein is meant a space existing in the layer defined by solid washcoat material. Voids can include any vacancy, fine pore, tunnel-state, slit and can be introduced by including in a washcoat composition for coating on the porous substrate a material that is combusted during calcination of a coated porous filter substrate, for example chopped cotton or materials to give rise to pores made by formation of gas on decomposition or combustion. The average void of the washcoat can be from 5 to 80% with the average void diameter from 0.1 to 1000 μm. Inclusion of the voids is used to compensate for any increase in backpressure as the coating is on-wall.

NO exhaust gases exiting the catalysed soot filter have an increased percentage of NO$_2$ as compared to NO gases entering the catalysed soot filter. The ratio of NO$_2$:NO on entering the catalysed soot filter is typically between 5:95 to 40:60 for exhaust emissions from a diesel engine. The ratio of NO$_2$:NO on exiting the catalysed soot filter is between 10:90 to 90:10.

Without wishing to be bound by theory it is believed that the careful choice and positioning of inlet and outlet on-wall coatings means that substantially all of soot/PM emitted from the diesel engine is trapped by both the uncoated porous substrate on the inlet wall and the on-wall inlet coating. The catalytic coating composition on the inlet wall oxidises some of the NO that is emitted from the diesel engine to NO$_2$. Passive regeneration of the filter occurs in the presence of NO$_2$. During the regeneration process the particulate matter is oxidised and the NO$_2$ is converted back to NO. This NO and any residual NO$_2$ passes through the porous substrate and through the outlet wall coating where some of the NO is oxidised to NO$_2$. There is negligible PM on the outlet wall so this NO$_2$ is not required for any further passive regeneration and passes through the outlet wall with the residual NO. Hence the NO exiting the system has a higher percentage of NO$_2$ than that entering the system. The coating compositions also oxidise the small quantities of CO and HC emitted from the exhaust.

As discussed earlier SCR involves use of ammonia in the presence of a suitable catalyst which acts as a selective reductant for NO$_x$. SCR as a treatment is prone to contamination from HC, CO and PM which reduces its effectiveness. Often a majority of NO emitted from the exhaust system is NO whereas it has been shown previously that fast reaction kinetics for the SCR reaction are for a combination of NO and $NO_2$ in a 50:50 ratio. $NO_2$ is the more reactive compound from NO and hence its presence can extend the operating temperature of the SCR to lower temperatures.

The treatment of emissions from diesel engines by the catalytic soot filter of the invention can result in the removal of PM, HC and CO and the conversion of some of the NO in $NO$ emitted from the engine into $NO_2$. Therefore, the exhaust gas emitted from the catalytic soot filter can promote the SCR reaction thereby to reduce $NO_x$ and meet the more stringent Euro 6 $NO_x$ emission regulations.

According to a second aspect, the invention provides an exhaust system for a diesel engine comprising the catalysed soot filter of the invention and a selective catalytic reduction catalyst disposed downstream of the catalysed soot filter.

Ammonia is typically used as the reducing agent in the SCR reaction. The exhaust system according to the second aspect preferably comprises means, when in use, for introducing a reducing agent precursor into exhaust gas upstream of the SCR catalyst. For example urea water is typically used as a reducing agent precursor and may be sprayed into exhaust gas upstream of a SCR catalyst via a nozzle. It is then thermally or hydrolytically resolved to liberate ammonia. In a preferred embodiment, the means for introducing a reducing agent precursor into exhaust gas upstream of the SCR catalyst includes a source of ammonia, such as a tank of urea.

In a preferred embodiment the SCR catalyst is coated onto a flow through substrate. Flow through substrates for use with the SCR catalyst in the present invention are preferably composed of ceramic or ceramic like materials or of refractory metals. Examples of ceramic or ceramic-like materials include cordierite, α-alumina, silicon carbide, silicon nitride, zirconia, mullite, spodumene, alumina-silica-magnesia or zirconium silicate. Examples of refractory metals include stainless steel. Most preferably the flow through substrate is composed of ceramic or ceramic like materials especially cordierite and silicon carbide.

The flow-through substrate is a flow-through monolith preferably having a honeycomb structure with a plurality of small, parallel thin-walled channels running axially through the substrate and extending throughout the substrate, i.e. from an open inlet end to an open outlet end. The channel cross-section of the substrate may be any shape, but is preferably square, sinusoidal, triangular, rectangular, hexagonal, trapezoidal, circular, or oval.

The SCR catalyst is preferably comprises titanium dioxide, vanadium pentoxide, tungstic trioxide, molybdenum trioxide, silicon dioxide, zeolite, zeolite in combination with, e.g. ion-exchanged with, a base metal component such as Fe or preferably Cu, and combinations thereof. A particularly preferred SCR catalyst comprises a copper-exchanged CHA zeolite.

The SCR catalyst composition can be coated at a concentration of at least 0.5 $g/in^3$ and preferably from 1.0 to 3.0 $g/in^3$ The SCR catalyst selectively reduces and purges $NO_x$ contained in exhaust gas and transforms it into nitrogen and water, which have less impact on the environment.

In a further embodiment of the exhaust system according to the present invention an oxidation catalyst is disposed downstream of the SCR catalyst to ensure against any ammonia slip. By "downstream" we mean either that the oxidation catalyst is coated on the trailing edge of the flow through substrate of the SCR catalyst, or that the oxidation catalyst is coated on a separate substrate monolith from the SCR catalyst.

In an alternative embodiment the second aspect of the present invention provides an emission treatment system for a diesel engine comprising the catalysed soot filter of the invention and a lean $NO_x$ trap (LNT) catalyst disposed downstream of the catalysed soot filter.

A typical LNT catalyst is coated on a flow through monolith substrate. The LNT catalyst typically includes a $NO_x$ adsorbent, usually an alkaline earth metal oxide, for the storage/trapping of $NO_x$ and an oxidation/reduction catalyst. The oxidation/reduction catalyst generally comprises one or more noble metals, preferably platinum, palladium, and/or rhodium. Typically, platinum is included to perform the oxidation function and rhodium is included to perform the reduction function.

In a further embodiment of the invention a diesel oxidation catalyst (DOC) is disposed upstream of the catalytic soot filter of the first aspect of the present invention.

The DOC composition typically comprises at least one platinum group metal dispersed on a refractory metal oxide, a reducible metal oxide or any combination of two or more thereof as a support. Such a DOC is formed on a ceramic or metallic monolith substrate upon which one or more catalyst coating compositions may be deposited, whether in a zoned arrangement, i.e. a first, upstream zone of a first DOC catalyst composition; and a second, downstream zone of a second DOC catalyst composition; or a layered arrangement.

In this embodiment the DOC is able to oxidise NO, present in the $NO_x$ emitted from the diesel engine, to $NO_2$ before the exhaust emissions enter the catalysed soot filter. Therefore, in this embodiment the inlet coating length can be substantially reduced in the catalytic soot filter, for example to 10 to 30% of the substrate axial coating length.

According to a further aspect, the invention provides a method of increasing $NO_2/NO_x$ ratio % in a diesel exhaust gas comprising $NO_x$ for downstream processes, which method comprising contacting the exhaust gas with a catalysed soot filter according to the first aspect of the present invention or an exhaust system according to the second aspect of the present invention.

In a preferred embodiment, the downstream process comprises the selective catalytic reduction of oxides of nitrogen using a SCR catalyst and a nitrogenous reductant.

In order that the invention may be more fully understood, the following embodiment and Examples will now be described by way of illustration only and with reference to the accompanying drawings, in which:

FIG. 1 is a graph showing the percentage of $NO_2$ in $NO_x$ emitted from a catalytic soot filter of the invention (where a majority of catalyst coating composition is on the outlet wall) and for a comparative catalytic soot filter (where a majority of the catalyst coating is on the inlet wall) over time as the soot loading on the catalytic soot filter is increased.

Figure 2:
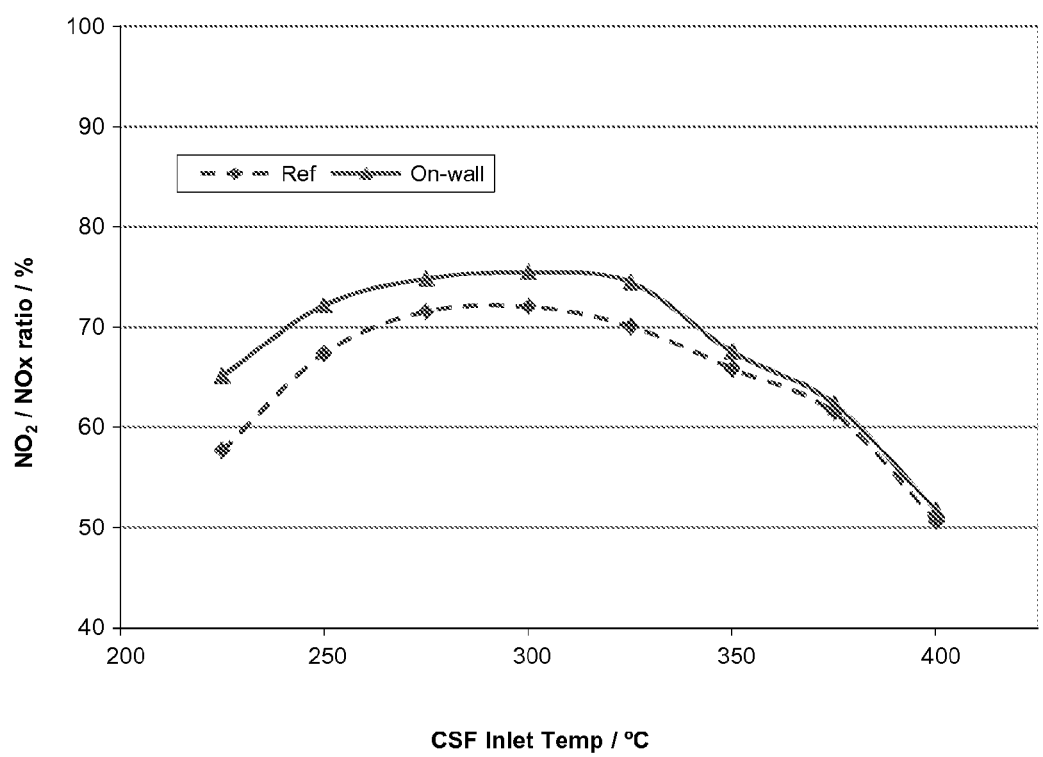
FIG. 2 is a graph showing the percentage of $NO_2$ in $NO_x$ emitted from a catalytic soot filter according to the invention and for a comparative catalytic soot filter, wherein in both cases there is a DOC coated on a separate monolith substrate disposed upstream of the catalytic soot filter.
Figure 3:
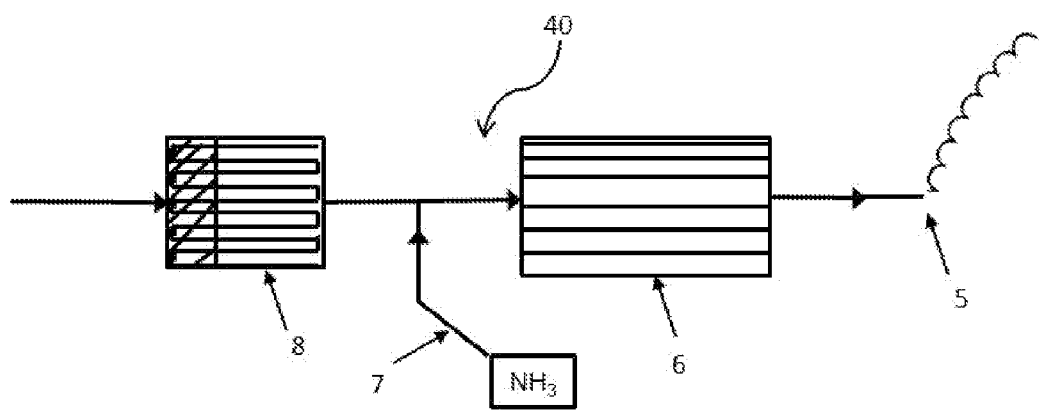
FIG. 3 is a schematic drawing of an embodiment of an exhaust system according to the present invention.

FIG. 2 is a graph showing the percentage of $NO_2$ in $NO_x$ emitted from a catalytic soot filter (CSF) according to the invention wherein the catalyst coating composition is on-wall and for a comparative catalytic soot filter where the catalyst coating composition is in-wall, wherein in both cases there is a DOC coated on a separate monolith substrate disposed upstream of the catalytic soot filter; and FIG. 3 shows a schematic drawing of an exhaust system according to the present invention.

Referring to FIG. 3, there is shown an exhaust system 40 for a diesel engine according to the present invention comprising a catalysed soot filter according to the present invention 8 having a Pt/Pd inlet channel coating which extends axially for 35% of a total axial substrate length from the open inlet channel ends and an axial outlet channel coating of the same Pt/Pd coating as the inlet channels that extends for 65% from the open outlet channel ends. Downstream of the outlet end of the catalysed soot filter is means for injecting a nitrogenous reductant (represented by the chemical nomenclature for ammonia, i.e. $NH_3$), e.g. an ammonia precursor urea, into exhaust gas upstream of a SCR catalyst 6. SCR catalyst 6 is a CuCHA SCR catalyst, which is coated on a flow through substrate monolith. An outlet surface of the flow through substrate monolith comprising the SCR catalyst can comprise a catalyst for oxidising $NH_3$ which slips past the SCR catalyst to $N_2$, such as a 3 $g/ft^3$ Pt/alumina catalyst disposed in a layer below the CuCHA catalyst. Exhaust gas emitted from a downstream end of the SCR flow through substrate monolith is exhausted to atmosphere at tail pipe 5.

EXAMPLES

Example 1

A catalysed soot filter according to the invention was prepared by coating a silicon carbide wallflow substrate of 5.66 inches (14.38 cm) diameter by 8 inches (20.32 cm) length having 300 cells per square inch (cpsi), 58% porosity and 22 μm pore size. Using established CSF coating techniques, 80% of the coating was applied over 80% of the substrate's axial length from the outlet end of the outlet channels and 20% of the coating was over 20% of the substrate's axial length from the inlet end of the inlet channels. The coating slurry comprised of platinum and palladium in a weight ratio of 10:1 supported on an alumina carrier. The filter was then oven aged in air at 750° C. for 5 hrs.

The platinum/palladium is present at a concentration of 10 $g/ft^3$ and the on-wall coating composition has a washcoat loading of 0.55 $g/in^3$ for both the inlet and outlet, with a D50 of less than or equal to 10 μm.

Example 2

A comparative catalysed soot filter was prepared by coating the same silicon carbide wallflow substrate as used in Example 1 with the same coating as is described in Example 1, except in that 80% of the coating was applied over 80% of the substrate's axial length of the inlet channels from the inlet ends thereof and 20% of the coating was applied over 20% of the substrate's axial length from the outlet end of the outlet channels.

Example 3

Both catalysed soot filters of Example 1 and Example 2 were exposed to exhaust emissions from a 2.0 liter turbo charged diesel bench engine using diesel fuel with 50 ppm sulphur content running a repeated transient cycle over a ten hour period, with a maximum catalysed soot filter inlet temperature of about 310 to 315° C.

FIG. 1 shows the percentage of $NO_2$ in the $NO_x$ emitted from the catalysed soot filters of Example 1 and Example 2. It is clear from the results shown for Example 1 that when the coating composition is mostly present on the outlet wall there is a higher percentage of $NO_2$ in the $NO_x$ exiting the catalysed soot filter. Furthermore, the percentage of $NO_2$ exiting the catalysed soot filter is much more stable than that when the coating composition is mostly present on the inlet wall.

FIG. 1 clearly shows that diesel exhaust gas exiting the catalysed soot filter of the invention has the preferred composition of $NO_2/NO$ of total $NO_x$ for effective treatment of the $NO_x$ emissions by, for example, a downstream SCR catalyst.

Example 4

A catalysed soot filter according to the invention was prepared by coating a silicon carbide wallflow substrate of 3.0 liters volume having 300 cpsi, 42% porosity and 14 μm pore size with platinum/palladium in a weight ratio of 10:1 supported on alumina coating composition. The filter was then oven-aged in air at 750° C. for 10 hrs.

The platinum/palladium is present at a concentration of 50 $g/ft^3$ on 30% of the axial length of the inlet channel walls from the inlet end with a washcoat loading of 0.35 $g/in^3$ and a D50 of between 7 and 8 μm. The outlet channel walls are coated along 70% of their axial length from the outlet end with the platinum/palladium coating composition at a concentration of 50 $g/ft^3$ with a washcoat loading of 0.20 $g/in^3$, with a D50 of between 7 and 8 μm.

Example 5

A diesel oxidation catalyst was prepared by coating a ceramic flow through substrate of 4.66 inches (11.84 cm) diameter by 5.7 inches (14.48 cm) length with platinum/palladium in a weight ratio of 2:1 supported on an alumina coating composition. The diesel oxidation catalyst was then oven aged in air at 750° C. for 25 hrs.

The platinum/palladium is present at a concentration of 60 $g/ft^3$ with a washcoat loading of 3.1 $g/in^3$.

Example 6

A comparative catalysed soot filter invention was prepared by coating a silicon carbide wallflow substrate as per Example 1 with platinum/palladium in a weight ratio of 10:1 supported on alumina coating composition. The inlet channels were coated with 80% of the coating composition over 80% of the substrate's axial length from the inlet ends thereof and 20% of the coating composition was coated over 20% of the substrate's axial length from the outlet end. The filter was then oven aged at 750° C. for 10 hrs.

The platinum/palladium was present at a concentration of 50 $g/ft^3$ with a washcoat loading of 0.35 $g/in^3$, with a D50 of about 2.5 μm for both inlet and outlet coating compositions. The D50 of 2.5 μm is indicative of in wall coating.

Example 7

Both catalysed soot filters of Example 4 and Example 6 were exposed to exhaust emissions from a 2.4 liter turbo charged diesel bench engine test. In both cases the DOC of Example 5 was positioned upstream of the catalytic soot filter. The engine was run in such a way as to obtain a sequential temperature increase in 25° C. intervals from 225 to 400° C. and the temperature was held at each step for 10 minutes after each temperature increase. Emissions measurements were recorded downstream of the CSF at each temperature point and the results are shown in FIG. 2.

FIG. 2 shows that the exhaust system comprising the comparative catalysed soot filter of Example 6 (labelled "Ref" in the Figure) has a lower $NO_2/NO_x$ ratio % up to about 350° C. compared with the exhaust system comprising the catalysed soot filter according to the invention of Example 4. At about 350° C. and above, the oxidation of NO to $NO_2$ is thermodynamically limited, as is well known in the art. It follows that for applications which require an increased $NO_2/NO_x$ ratio %, the exhaust system comprising the soot filter of Example 6 is preferred.

For the avoidance of any doubt, the entire contents of any and all prior art documents cited herein are incorporated herein by reference.

We claim:

1. A catalysed soot filter for a diesel engine, which filter comprising a wall flow substrate comprising an inlet end, an outlet end, a substrate axial length extending between the inlet end and the outlet end, and a plurality of channels defined by internal walls of the wall flow substrate, wherein the plurality of channels comprise a plurality of inlet channels having an open inlet end and a closed outlet end and a plurality of outlet channels having a closed inlet end and an open outlet end, wherein external surfaces of the internal walls of the plurality of inlet channels comprise a washcoat of at least one on-wall inlet coating composition that extends for an axial inlet coating length from the open inlet end to a downstream inlet coating end, wherein the axial inlet coating length is less than the substrate axial length, wherein external surfaces of the internal walls of the plurality of outlet channels comprise a washcoat of at least one on-wall outlet coating composition that extends for an axial outlet coating length from an upstream outlet end to the open outlet end, wherein the axial outlet coating length is less than the substrate axial length, wherein the outlet coating length is greater than the inlet coating length and wherein both the inlet and outlet coating compositions comprise at least one catalytically active metal as catalyst for increasing the percentage of $NO_2$ of total $NO_x$ in exhaust gas exiting the catalysed soot filter as compared to $NO_x$ gases entering the catalysed soot filter.

2. A catalysed soot filter according to claim 1, wherein the wall flow substrate comprises surface pores having a mean size of from 4 to 40 μm.

3. A catalysed soot filter according to claim 1, wherein the axial inlet coating length is from 10 to 45% of the substrate axial length.

4. A catalysed soot filter according to claim 1, wherein the on-wall inlet coating composition comprises at least one catalytically active metal selected from the group consisting of platinum, palladium, iridium, rhodium, silver, gold and mixtures of any two or more thereof and the at least one on-wall outlet coating composition comprises at least one catalytically active metal selected from the group consisting of platinum, palladium, iridium, rhodium, silver, gold and mixtures of any two or more thereof.

5. A catalysed soot filter according to claim 4, wherein the at least one catalytically active metal of the on-wall inlet coating composition is platinum, palladium or a mixture of both platinum and palladium and the at least one catalytically active metal of the on-wall outlet coating composition is platinum, palladium or a mixture of both platinum and palladium.

6. A catalysed soot filter according to claim 4, wherein the at least one catalytically active metal of the on-wall inlet coating composition is present on the external surfaces of the inlet channel walls at a concentration of from 1 to 150 $g/ft^3$ and the at least one catalytically active metal of the on-wall outlet coating composition is present on the external surfaces of the outlet channel internal walls at a concentration of from 1 to 150 $g/ft^3$.

7. A catalysed soot filter according to claim 1, wherein the at least one on-wall inlet coating composition further comprises a refractory metal oxide selected from the group consisting of alumina, silica, silica-alumina, alumina silicates, alumina-zirconia, alumina-chromia, titania, titania-silica, titania-zirconia and alumina at a loading of from 0.05 to 1.0 $g/in^3$, and the at least one on-wall outlet coating composition comprises a refractory metal oxide selected from the group consisting of alumina, silica, silica-alumina, alumina silicates, alumina-zirconia, alumina-chromia, titania, titania-silica, titania-zirconia and alumina at a loading of from 0.05 to 1.0 $g/in^3$.

8. A catalysed soot filter according to claim 1, wherein the at least one on-wall inlet coating composition comprises a rare earth metal oxide selected from an oxide of cerium, praseodymium, lanthanum, neodymium and samarium at loadings ranging from 50 to 1000 $g/ft^3$, and the at least one on-wall outlet coating composition further comprises a rare earth metal oxide selected from an oxide of cerium, praseodymium, lanthanum, neodymium and samarium at concentrations ranging from 50 to 1000 $g/ft^3$.

9. A catalysed soot filter according to claim 1, wherein the at least one on-wall inlet coating composition is present at a washcoat loading of 0.1 to 2.0 $g/in^3$, and the at least one on-wall outlet coating composition is present at a washcoat loading of 0.1 to 2.0 $g/in^3$.

10. A catalysed soot filter according to claim 1, wherein the mean particle size (D50) of the washcoat of the at least one on-wall inlet coating composition is between 4 and 15 μm and the mean particle size (D50) of the washcoat of the at least one outlet coating composition is between 4 and 15 μm.

11. A catalysed soot filter according to claim 1, wherein the axial outlet coating length is from 55 to 90% of the substrate axial length.

12. A catalysed soot filter according to claim 1, wherein the coating composition on the external surfaces of the inlet channel internal walls comprises the same ingredients as the coating composition on the external surfaces of the outlet channel internal walls.

13. A catalysed soot filter according to claim 12, wherein these same ingredients are present at the same loading in each coating composition.

14. A catalysed soot filter according to claim 1, wherein the axial outlet coating length is at least 10% longer than the axial inlet coating length when expressed as a percentage of the total substrate axial length.

15. A catalysed soot filter according to claim 1, wherein the axial inlet coating length and the axial outlet coating length together are equal to the axial substrate length.

16. An exhaust system for a diesel engine comprising a catalysed soot filter according to claim 1 and a selective catalytic reduction catalyst or a $NO_x$ absorber catalyst disposed downstream of the catalysed soot filter.

17. An exhaust system according to claim 16, wherein an oxidation catalyst for oxidising ammonia to $N_2$ is disposed downstream of the selective catalytic reduction catalyst.

18. An exhaust system according to claim 16, wherein a diesel oxidation catalyst is disposed upstream of the catalytic soot filter.

19. An exhaust system according to claim 18, wherein the axial inlet coating length in the catalysed soot filter is from 10 to 30% of the substrate axial length.

20. A method of increasing $NO_2/NO_x$ ratio in a diesel exhaust gas comprising $NO_x$ for a downstream process, which method comprises contacting the exhaust gas with a catalysed soot filter according claim 1, wherein the downstream process comprises the selective catalytic reduction of oxides of nitrogen using a SCR catalyst and a nitrogenous reductant.

* * * * *